Figure 1:
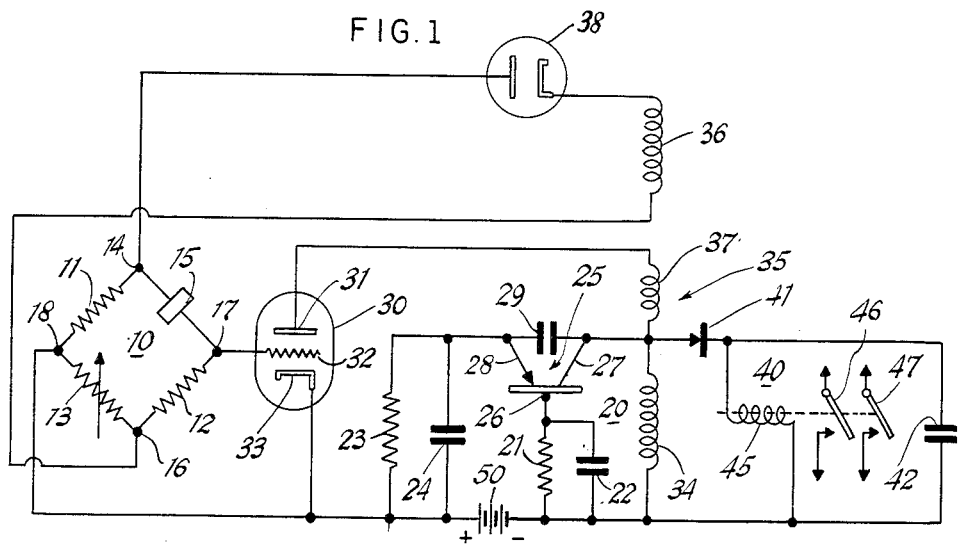

Dec. 4, 1956 M. ARON 2,773,220
LIGHT SENSITIVE RELAY CIRCUIT
Filed Nov. 10, 1954

INVENTOR
Mitchell Aron
BY
ATTORNEY

United States Patent Office 2,773,220
Patented Dec. 4, 1956

2,773,220

LIGHT SENSITIVE RELAY CIRCUIT

Mitchell Aron, Brooklyn, N. Y., assignor to Radio Receptor Company, Inc., Brooklyn, N. Y., a corporation of New York Application November 10, 1954, Serial No. 467,909

10 Claims. (Cl. 317—130)

This invention relates to signal responsive relay operating circuits and, more particularly, to such a circuit utilizing a high impedance, low energy sensitive device as a control signal element operating from a low voltage D. C. supply without the use of an auxiliary B+ supply.

The invention circuit is particularly useful as the control signal component of an automatic headlamp dimming arrangement for automotive vehicles, operating from the usual vehicle battery and electric system without requiring additional or auxiliary sources of power or potential.

Automotive vehicle headlamps are customarily provided with two filaments which may be called, respectively, the "high beam" filament and the "low beam" filament. These two filaments are so disposed, relative to the headlamp reflector surface, that the "low beam" light is directed somewhat downwardly so as to illuminate the route for only a relatively short distance in advance of the vehicle, while the "high beam" light is directed more nearly horizontally and illuminates the route for a substantial distance in advance of the vehicle. Frequently, the "high beam" filament has a candlepower rating substantially in excess of that of the "low beam" filament.

The "low beam" or "dim" light is used on lighted routes, when driving at lower speeds, and when passing an approaching vehicle, as its direction angle is such as not to affect substantially the vision of the driver of an approaching vehicle.

The "high beam" or "bright" light is used for driving or unlighted routes and for high speed driving. It has the disadvantage that its angle is such as to at least partially blind the driver of an oncoming vehicle. Consequently, safe drivers dim their headlamps, when sighting an approaching vehicle, by switching from the "high beam" to the "low beam."

Such selection of the "dim" or "bright" light is usually effected by operating a foot switch. On successive operations, this switch alternately energizes the "bright" and "dim" filaments. However, operation of this foot switch requires some attention from the driver, thereby creating a hazard when two vehicles are approaching each other at high speeds. Also, after the vehicles have passed each other, the headlamps should be switched back to "bright" to compensate for the suddenly decreased illumination of the route as the vehicles pass each other. The necessary attention to this switching also creates a hazard in high speed driving.

To eliminate these hazards, it has been proposed to dim the headlamps automatically in response to the light from an approaching vehicle, and systems have been designed to accomplish this automatic dimming. In general, such systems switch the headlamps from "bright" to "dim" when the light intensity on a sensing device at the front of the vehicle exceeds a pre-set value, and switch the headlamps back to "bright" when the light intensity on the sensing device is less than a predetermined value.

Such systems desirably should be so designed so that the headlamps operate in the usual manner when the foot switch is operated, and also are automatically dimmed (if on "bright") when a vehicle approaches. Furthermore, the system should control the headlamps in such manner that the operator can manually "lock" the headlamps in the "dim" position, but cannot manually "lock" the headlamps in the "bright" position. In other words, the lights should always be dimmed by the system whenever another vehicle approaches.

For this reason, it has been proposed that switching of the headlamps between "bright" and "dim" be effected by a relay arrangement which is conjointly controlled by a driver-operated foot switch and the automatic dimming system, with the arrangement being so designed that the automatic dimming system switches the headlamps to "dim" irrespective of whether or not the foot switch is operated to the "bright" position.

The relay control circuit of the invention, while not limited to such use, is particularly useful as the oncoming headlamp light responsive control component for operating the headlamp switching relay arrangement of an automatic headlamp dimming system.

In accordance with the invention, a resistance bridge is provided having in one arm an energy sensitive element such as a light-sensitive crystal of cadmium sulphide or cadmium selenide. The bridge is activated by the rectified output component of a transistor oscillator, and the bridge output drives a thermionic triode between the cathode and grid of the latter. The anode circuit of the triode is coupled to the tank coil of the oscillator, with the plate circuit impedance so adjusted that, when the triode grid bias is zero, the oscillator output is damped to only a fraction of its value when the triode is biased to cut-off. The rectified output component of the oscillator is used to energize a relay which may control the operation of vehicle headlamps, for example.

With the energy-sensitive element in total darkness, the bridge is adjusted so that its output is slightly positive, causing the triode to damp the oscillator to maintain a reduced oscillator output which is sufficient to energize the bridge but insufficient to operate the relay. When light is incident upon the sensitive element, the latter becomes more conductive. This decreases the impedance of the bridge and thus the potential difference between the cathode and grid of the triode. As a result, the potential of the triode grid becomes more negative relative to the cathode so that the triode plate circuit no longer damps the oscillator. The oscillator output thus increases and operates the relay as well as increasing the sensitivity of the bridge. Thus, once the relay is closed, the ratio of pull-in current to pull-out current of the relay, in combination with the increased sensitivity of the bridge, provides a convenient step-down characteristic when the circuit is used in a headlamp dimming arrangement.

For an understanding of the invention principles, reference is made to the following description of typical embodiments thereof as illustrated in the accompanying drawing.

Figure 2:
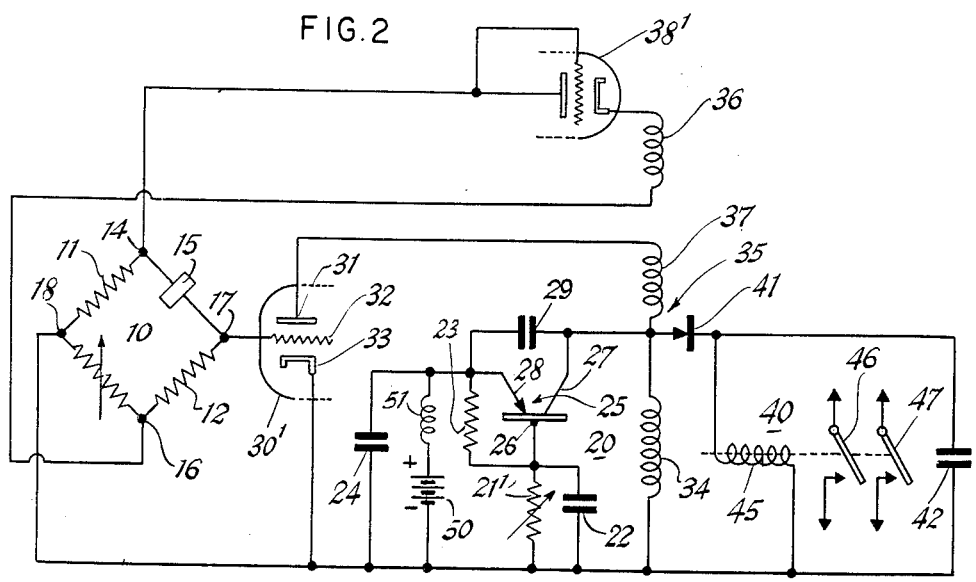

In the drawings:

Fig. 1 is a schematic wiring diagram of one relay circuit embodying the invention; and Fig. 2 is a similar diagram of a modified embodiment of the invention.

Referring to Fig. 1 of the drawing, the relay circuit of the invention includes a resistance bridge 10 which is energized from the rectified output of a transistor oscillator 20 and drives a thermionic triode 30. The rectified oscillator output component also energizes a relay 40. All the required potentials are provided from a single, low-voltage D. C. source 50 which may be the usual 6-volt automotive vehicle battery or generator.

Bridge 10 includes fixed resistors 11, 12, an adjustable resistance or potentiometer 13, and an energy sensitive element 15. Element 15 may be a light-sensitive crystal of cadmium sulphide or cadmium selenide.

The transistor oscillator comprises a transistor 25 having a base electrode 26, a collector electrode 27, and an emitter electrode 28, a condenser 29 being connected between the collector and emitter electrodes. Base electrode 26 is connected to the negative terminal of battery 50 through a resistor 21 in parallel with a condenser 22. A resistor 23 is connected, in series with emitter electrode 28, to the positive terminal of battery 50.

The tank circuit of oscillator 20 includes capacitance 24 and an inductance comprising one coupled winding 34 of a three-winding transformer 35 having additional windings 36 and 37. Winding 36 applies energizing potential for bridge 10 and winding 37 is connected in the plate circuit of thermionic triode 30. Winding 36 is connected across two opposite junctions 14, 16 of bridge 10, with a diode 38 being interposed to rectify this component of the oscillator output.

Winding 37 has one terminal connected to the plate 31 of triode 30 and its other terminal connected to collector electrode 27 in common with one terminal of winding 34. Grid 32 of triode 30 is connected to junction 17 of bridge 10, and the fourth bridge junction 18 is connected to cathode 33 of the triode and to the positive terminal of battery 50.

Coil 45 of relay 40 is connected across winding 34 in series with a germanium diode 41, and is illustrated as operating one or more relay contacts 46, 47 which may, for example, control the switching of automotive headlamps between "bright" and "dim." A condenser 42 is connected across coil 45. Diode 41 rectifies the component of the oscillator output applied to relay 40.

With sensitive element 15 in total darkness, potentiometer 13 is adjusted to adjust bridge 10 so that the bridge output, applied between grid 32 and cathode 33 of triode 30, is slightly positive. The resultant impedance of the triode plate circuit, in series with transformer winding 36, damps oscillator 20 through the coupling to tank circuit winding 34. The oscillator output is sufficient to produce the driving voltage for bridge 10 but insufficient to pick up relay 40.

When light of a predetermined intensity falls on element 15, grid 32 goes negative so that triode 30 no longer damps oscillator 20. The increased oscillator output picks up relay 40 and maintains the relay energized as long as the light incident upon element 15 is above a preset value less than the initial operating value.

This "hold-in" at a lesser light value than required for "pull-in" is due to the increased sensitivity of bridge 10 due to the increased output of oscillator 20. This is important in automatic headlamp dimming arrangements. When the headlamps are automatically dimmed responsive to light from an approaching vehicle, the ambient light level is reduced, with further reduction upon responsive dimming of the approaching headlamps. Without any means for "holding-in" at a lesser light value than required for "pull-in," the control would thus switch the headlamps back to "bright." The ratio of the "pull-in" value for relay 40 to the "hold" value therefor, plus the increased sensitivity of bridge 10 when relay 40 is closed, provides the necessary safety margin for holding the headlamps on "dim" even through the light incident on element 15 is reduced.

The modified circuit shown in Fig. 2 is essentially similar to that of Fig. 1, and like parts have been given the same reference characters, with corresponding, but unlike, parts having the same reference character primed. In the circuit of Fig. 2, base electrode resistor 21 is replaced by a linear potentiometer 21' to adjust the power. Emitter resistance 23 is connected between emitter 28 and base 26. Triode 30 and diode 38 are combined into a dual triode connected to provide a triode section 30' and a diode section 38'. Battery 50 is connected, in series with a choke 51, between emitter 28 and ground.

Potentiometer 21' provides for adjustment of the base bias to pre-set the operating point of transistor 25, while choke 51 blocks A. C. flow from battery 50. Otherwise, the circuit of Fig. 2 operates in the same manner as that of Fig. 1.

While specific embodiments of the invention have been shown and described in detail to illustrate the application of the invention principles, it will be understood that the invention may be embodied otherwise without departing from such principles.

What is claimed is:

1. A sensitive relay circuit comprising, in combination, an energy sensing element having an electrical resistance variable as a function of the energy received thereby; a transistor oscillator having an output circuit; a relay having an operating coil connected in said output circuit for energization thereby; a low voltage source of D. C. potential connected to supply operating potential to said oscillator and in circuit connection with said relay operating coil; an amplifier having an input circuit including said element connected in series with the amplifier control element, and an output circuit coupled in series with said oscillator output circuit; means, including circuit connections, for applying across said amplifier input circuit a rectified operating potential derived from said oscillator output circuit; and sensitivity adjustment means in series with said element and said input circuit to adjust the bias of said input circuit to a value such that said amplifier is conductive when no light is incident on said element; whereby, when no light is incident on said element, said amplifier will damp the oscillator output to a value insufficient to energize said coil.

2. A relay circuit as claimed in claim 1 in which the electrical resistance of said energy sensing element is variable in response to light incident thereupon.

3. A relay circuit as claimed in claim 2 including a rectifier in series with said relay operated coil.

4. A relay circuit as claimed in claim 2 in which said amplifier is a triode having a grid connected in series with said element and biased slightly positive when no light is incident on said element.

5. A relay circuit as claimed in claim 2 including a transformer having three coupled windings, one connected in series with a rectifier to apply rectified potential across said amplifier input circuit, a second connected across the amplifier output circuit, and a third connected across the oscillator output circuit.

6. A relay circuit as claimed in claim 2 including a transformer having three coupled windings, one connected to apply potential to said element, a second connected across the amplifier output circuit, and a third connected across the oscillator output circuit, and a rectifier connected in series with said one winding.

7. A relay circuit as claimed in claim 2 in which said element is connected in one arm of a resistance bridge connected in the amplifier input circuit and in the oscillator output circuit.

8. A relay circuit as claimed in claim 2 in which said element is connected in one arm of a resistance bridge connected in the amplifier input circuit and in the oscillator output circuit, and said sensitivity adjustment means comprises a potentiometer connected in another arm of said bridge.

9. A relay circuit as claimed in claim 2 in which said sensitivity adjustment means comprises a potentiometer connected in series with said element and said amplifier control element and cathode.

10. A relay circuit as claimed in claim 1 where the operating potential for the energy sensitive element is supplied by a relatively low voltage D. C. source.

(References on following page)

References Cited in the file of this patent

UNITED STATES PATENTS

| | | | |
|---|---|---|---|
| 1,983,715 | Usselman | Dec. 11, 1934 |
| 2,050,737 | Schriever | Aug. 11, 1936 |
| 2,189,462 | Donle et al. | Feb. 6, 1940 |
| 2,512,658 | Levy | June 27, 1950 |
| 2,546,784 | Roggenstein | Mar. 27, 1951 |
| 2,554,124 | Salmont | May 22, 1951 |
| 2,590,826 | Schenck | Mar. 25, 1952 |